United States Patent [19]

Kaashoek

[11] 3,714,500

[45] Jan. 30, 1973

[54] COLOR TELEVISION DISPLAY DEVICE

[75] Inventor: Johannes Kaashoek, Emmasingel, Eindhoven, Netherlands

[73] Assignee: U.S. Philips Corporation, New York, N.Y.

[22] Filed: June 22, 1970

[21] Appl. No.: 48,092

[30] Foreign Application Priority Data

June 27, 1969 Netherlands ........................6909887

[52] U.S. Cl. ............315/24, 315/27 XY, 315/27 GD

[51] Int. Cl. ..............................................H01j 29/70

[58] Field of Search ...315/24, 27 XY, 27 GD, 31 TV

[56] References Cited

UNITED STATES PATENTS 3,427,497 2/1969 Gostyn ..................................315/24

2,866,125 12/1958 Haantjes et al. ................315/27 GD 3,440,483 4/1969 Kaashoek et al. ......................315/24

*Primary Examiner*—Benjamin A. Borchelt

*Assistant Examiner*—S. C. Buczinski

*Attorney*—Frank R. Trifari

[57] ABSTRACT

A color television display device provided with two systems of deflection coils formed with symmetrical coil halves and with a correction circuit for correcting the deflection errors caused by the anisotropic astigmatism of the systems of coils. The coil halves of at least one system of deflection coils are provided with at least one tapping which form part of the correction circuit in which in parallel with the number of turns located between one tapping and one end and a different tapping of a coil half a line and field frequency controlled current source or impedance and an impedance only controlled at the line frequency, respectively, are connected.

18 Claims, 10 Drawing Figures

INVENTOR.
JOHANNES KAASHOEK
BY
AGENT

INVENTOR.
JOHANNES KAASHOEK
BY
Frank R. Trifari
AGENT

INVENTOR.
JOHANNES KAASHOEK

BY

AGENT

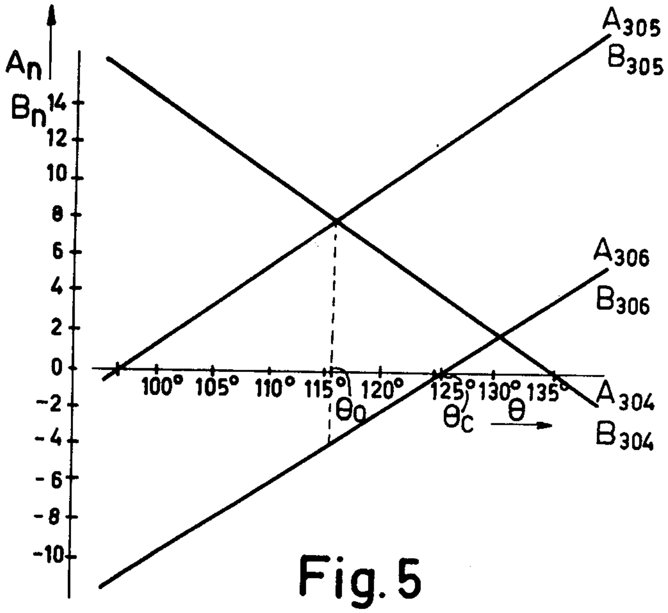
Fig. 5
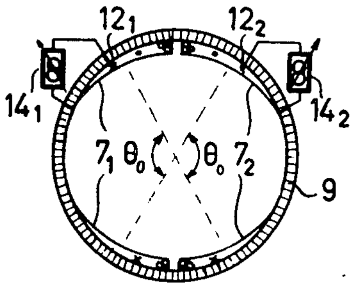
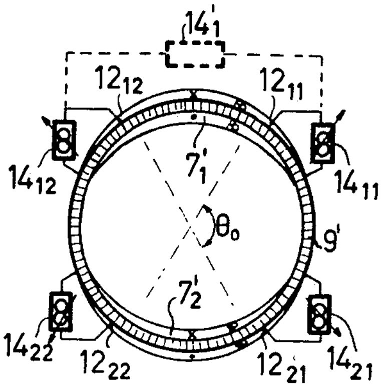
Fig. 6a
Fig. 6b
INVENTOR.
JOHANNES KAASHOEK
BY
[signature]
AGENT

COLOR TELEVISION DISPLAY DEVICE

The invention relates to a color television display device including a color television display tube provided with a display screen, wherein an electron gun generates at least one electron beam which is deflected in two right-angled directions by two systems of deflection coils, one system of coils being formed from two substantially symmetrical coil halves provided on either side of the neck of the display tube, while at least one end of each coil half of the respective systems of deflection coils is connected to a line and a field deflection current generator, the display device being provided with a correction circuit coupled to the line and field deflection current generators for correcting deflection errors on the said screen in a dynamic manner as a function of the instantaneous value and the direction of the deflection currents.

Such a color television display device has been described in U.S. Pat. specification No. 3,440,483. This specification states that the correction circuit serves for compensating deflection errors on the display screen caused by the anisotropic astigmatism of the systems of deflection coils. Although the deflection errors on the display screen become manifest in different manners for the various types of color television display tubes, which are, for example, of the indexing-tube, the shadow-mask tube or the chromatron type, the construction and the operation of the correction circuit is the same. The great deterioration in the quality of the color rendition caused by the deflection errors and/or the superposition of the partial pictures in the corners of the display screen are corrected by the correction circuit because unequal deflection currents are applied to the symmetrically formed halves of a system of deflection coils; the so-called difference current drive. The inequality is then a function of the product of the instantaneous values of the line and field deflection currents. As has been stated in the said patent specification the result is that a quasi-quadripolar field is generated by the system of deflection coils beyond the normal bipolar deflection field. The quasi-quadripolar field generated by the unequal deflection currents in the coil halves and the anisotropic astigmatism yield an equal, but oppositely directed additional deflection of the electron beam so that a compensation is the result.

The object of the present invention is to provide a correction circuit for deflection errors caused by the anisotropic astigmatism which in principle operates differently. To this end the device according to the invention is characterized in that the two coil halves of at least one system of deflection coils are each provided with at least one tap, which coil-half tappings form part of the correction circuit wherein a line and field-frequency controlled current source or impedance, or an impedance which is only line-frequency controlled are connected in parallel with the number of turns located between one tap and one end and a further tap of one coil half, respectively.

The invention is based on the recognition of the fact that it is possible to eliminate the cause of the deflection errors in a dynamic manner instead of compensating the deflection errors caused by the anisotropic astigmatism by means of an asymmetrical magnetic field generated by a system of deflection coils. Unlike the already proposed method of the difference current drive, the system of deflection coils then continues to generate a two-sided symmetrical magnetic field. The cause of the deflection errors may be eliminated both by controlling the extent of anisotropic astigmatism down to zero in each coil system and by giving two coil systems an anisotropic astigmatism which would yield equal, but oppositely directed deflection errors.

In order that the invention may be readily carried into effect, a few embodiments thereof will now be described in detail by way of example, with reference to the accompanying diagrammatic drawings, in which.

FIG. 4 shows a few correction circuits in FIGS. 4*a* and 4*b* and FIG. 4*c* and 4*d* show, plotted as a function of time, currents flowing therein and the characteristic curve of a variable impedance provided therein, FIG. 5 shows in a graph a few coefficients of the systems of deflection coils and FIG. 6 shows a system of deflection coils which is formed with saddle coils in FIG. 6*a* and with toroid coils in FIG. 6*b*.

Figure 1:
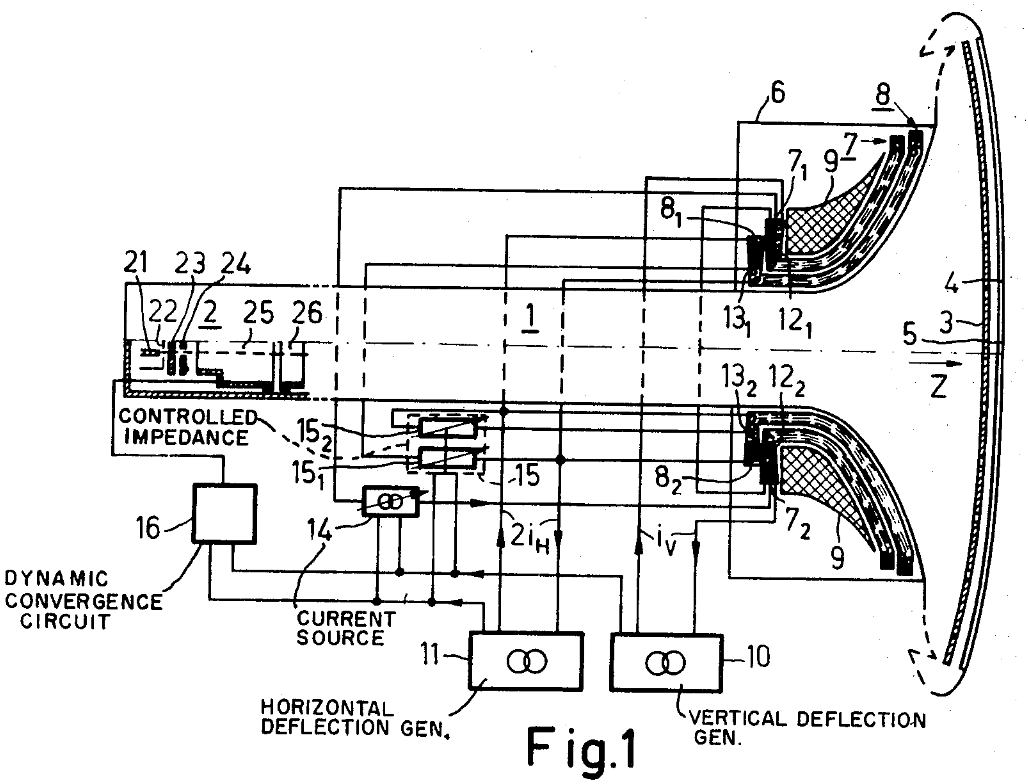
FIG. 1 shows a color television display device according to the invention.

In FIG. 1 the reference numeral 1 denotes a color television display tube shown diagrammatically. The display tube 1 is provided with an electron gun 2 which can generate at least one electron beam not shown. The electron gun 2 will be described in greater detail in the course of this description. An electron beam generated by the electron gun 2 impinges through a color selection raster formed as a so-called shadow mask 3 upon a display screen 5 provided with a luminescent layer 4. In the shadow-mask construction of the display tube 1, one electron gun 2 or three guns can generate three electron beams, the beams being located in the vertices of an equilateral triangle or arrayed in one plane. The color selection raster could alternatively be constructed as a raster having parallel wires instead of a screen having holes so that a chromatron is obtained. Without a color selection raster the display tube 1 may be constructed as an indexing tube. Dependent on the construction of the display tube 1, the luminescent layer 4 comprises dots or strips which, impinged upon by an electron beam generated by the electron gun 2, luminesce in red, green or blue light. For deflecting an electron beam generated by electron gun 2 in a plane at right angles to an axis of the display tube 1 indicated by the reference Z, a deflection unit 6 is provided around the neck of the display tube.

Under the influence of the deflection unit 6 an electron beam generated by the electron gun 2 should be deflected in such a manner that the point of impact on the luminescent layer 4 is on the correct dot or strip. The point of impact of the electron beam on the layer 4 comprising strips constitutes an ellipse as its most favorable shape the long axis of which lies in the direction of the strips. The anisotropic astigmatism of the deflection unit 6 causes a deflection error in the corners of the display screen 5 which becomes manifest by the ellipse-shaped point of impact being tilted. If in addition to the desired strip an adjacent strip is impinged upon which luminesces in a different color, a great deterioration in the quality of the color rendition occurs.

For a display tube 1 formed with a layer 4 comprising dots there applies that three electron beams are generally generated therein, each of which produces a partial picture in red, green or blue on the display screen 5. The partial pictures are to have a satisfactory superposition on the display screen 5. The deflection errors caused by the anisotropic astigmatism which may be different for the three electron beams disturbs the satisfactory superposition in the corners of the screen 5.

The deflection unit 6 is formed with two systems 7 and 8 of deflection coils each comprising two coil halves $7_1$, $7_2$ and $8_1$, $8_2$, respectively. The coil systems 7 and 8 are provided within a yoke 9 encompassing the neck of the display tube 1. It will be more apparent from the description hereinafter that the coil halves $7_1$, $7_2$, $8_1$ and $8_2$ of FIG. 1 are formed as so-called saddle coils. In the coil systems 7 and 8, which are diagrammatically shown, solid lines denote the parts of the turns which are located parallel to the plane of the drawing, while little circles denote those turns which are at right angles to the plane of the drawing. The coil system 8 ensures the deflection in the direction of lines which normally coincides with the horizontal direction. The coil system 7 ensures the deflection in the field direction, that is to say, the vertical direction. To this end, the deflection coil halves $7_1$ and $7_2$ which are, for example, series-arranged are connected to a field deflection current generator 10 and the coil halves $8_1$ and $8_2$ which are, for example, parallel-arranged are connected to a line deflection current generator 11. To accentuate the vertical and the horizontal deflection and the series and parallel arrangement of the coil halves $7_1$, $7_2$ and $8_1$, $8_2$, respectively, the currents provided by the generators 10 and 11 are denoted by $i_V$ and $2i_H$, respectively.

Figure 2:
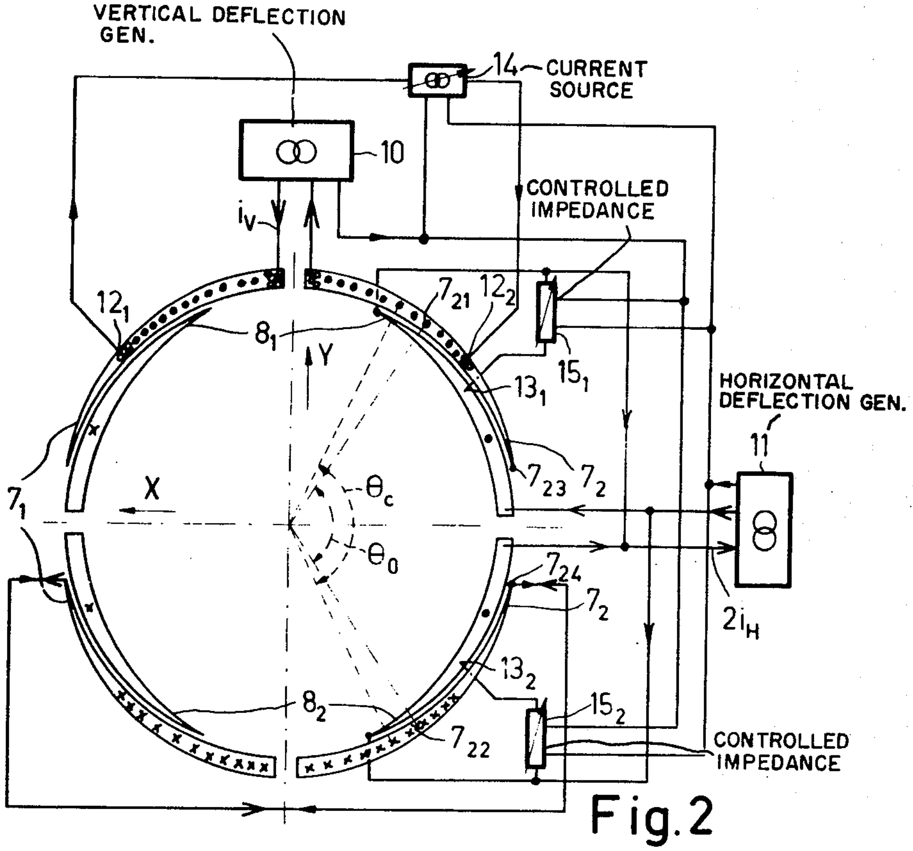
FIG. 2 is a different elevational view of part of the device according to FIG. 1.
Figure 3:
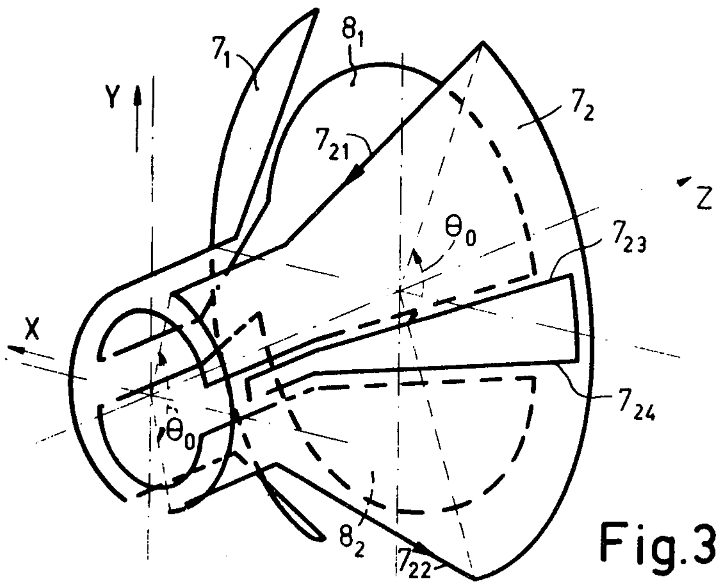
FIG. 3 shows a few turns of deflection coil systems formed with saddle coils so as to explain FIGS. 1 and 2.

Up to this point the device described is of the conventional type. For a simple explanation of the invention the device according to FIG. 1 together with the device according to FIG. 2 and the saddle-coil structure shown in FIG. 3 will be described. Identical components shown in FIGS. 1, 2 and 3 and in the following Figures are denoted by the same reference numerals. In FIGS. 2 and 3 the references X and Y denote two axes at right angles while the Z-axis is perpendicular to the axes X and Y. Likewise as FIG. 1, FIG. 2 is diagrammatically shown in cross-sections as well as in elevational views. In FIG. 2 two turns on the coil half $7_2$ are shown in which each time two parts are denoted by the reference numerals $7_{21}$, $7_{22}$ and $7_{23}$, $7_{24}$, respectively, and which are shown in a perspective view in FIG. 3.

The color television display device according to the invention shown in FIGS. 1 and 2 is formed with systems 7 and 8 of deflection coils the coil halves $7_1$, $7_2$ and $8_1$, $8_2$ of which are provided with taps $12_1$, $12_2$ and $13_1$, $13_2$, respectively. An adjustable current source 14 is connected between the taps $12_1$ and $12_2$ of the series-arranged coil halves $7_1$ and $7_2$. The current source 14 is to be controlled at the line and field frequencies and to this end it is coupled to the generators 10 and 11 for obtaining information regarding the instantaneous value and the direction of the currents $i_V$ and $2i_H$ provided by the deflection current generators 10 and 11. Adjustable impedances $15_1$ and $15_2$ are connected between the taps $13_1$ and $13_2$ and each to a different end of the parallel-arranged coil halves $8_1$ and $8_2$. As will be apparent from the description hereinafter the impedances $15_1$ and $15_2$ are to be adjusted at the line and field frequencies in the same manner to which end the assembly of impedances $15_1$ and $15_2$ denoted by the reference numeral 15 in FIG. 1 is coupled to the deflection current generators 11 and 10.

The display device according to FIG. 1 formed with a display tube 1 of the shadow-mask type, is provided with a convergence circuit 16. The dynamic convergence circuit 16, which is connected to the gun 2, is coupled to the deflection current generators 10 and 11 for obtaining information regarding the instantaneous value and the direction of the deflection currents $i_V$ and $i_H$. It will be found that for a given embodiment to be hereinafter described of the electron gun 2 in the display tube 1 the convergence circuit 16 should provide an additional convergence which is necessary for the control in accordance with the invention in addition to the convergence which is usually to be provided optionally for the three electron beams.

The display device according to FIGS. 1 and 2 is provided with a correction circuit (14, $12_1$, $12_2$) for the coil halves $7_1$ and $7_2$ so as to counteract the deflection errors on the screen 5 caused by the anisotropic astigmatism, and with a correction circuit (15, $13_1$, $13_2$) or ($15_1$, $15_2$, $13_1$, $13_2$) for the coil halves $8_1$ and $8_2$. The result achieved with the aid of the correction circuits will be described with reference to the correction circuit (14, $12_1$, $12_2$) and the system 7 of deflection coils for the vertical direction.

In FIG. 2 currents coming from the plane of the drawing are denoted by a dot and currents in the opposite direction are denoted by a cross. Particularly for the coil half $7_2$ it is shown in FIGS. 2 and 3 how the coil halves formed as saddle coils are constructed. The turn including the partial turns $7_{21}$ and $7_{22}$ is denoted by an angle $\theta_0$. The same angle $\theta_0$ is shown in FIG. 3 on either side of the coil half $7_2$, which angle is, however, not required. For unequal values the partial turns $7_{21}$ and $7_{22}$ may be characterized by a mean value of $\theta$ calculated in the direction of the said partial turns, that is to say, in the Z-direction.

FIG. 2 shows that the thickness of the coil half $7_2$ increases from the window of the partial turns $7_{23}$ and $7_{24}$ to the partial turns $7_{21}$ and $7_{22}$. The coil half $7_2$ has its greatest thickness at the end not further shown of the coil half $7_2$ which is connected to the generator 10. As regards the angle $\theta$ it is possible to provide a turn having an angle $\theta$ such that it may be considered to be an average angle for the coil half $7_2$, taking into account the individual mutually different contributions of the turns to the field distribution. In FIG. 2 it has been assumed that the average angle $\theta$ of the coil half $7_2$ is given by the angle $\theta_0$ of the turn including the partial turns $7_{21}$ and $7_{22}$.

The effect obtained with the aid of the correction circuit (14, $12_1$, $12_2$) is apparent in a clear manner with the aid of the current directions shown in FIGS. 1 and 2. The deflection current $i_V$ provided by the generator 10 and denoted by an open arrow symbol and the current supplied by the controlled current source 14 and denoted by a closed arrow symbol flow in the opposite direction in the plurality of turns of the series-arranged coil halves $7_1$ and $7_2$ located between the taps $12_1$ and $12_2$. For a larger or smaller value of the current provided by the current source 14 a larger or smaller number of amperes turns near the window is switched off, as it were, of each coil half $7_1$ and $7_2$, which will be referred to hereinafter as current distribution drive. The result is that the average angle $\theta$ of the two coil halves $7_1$ and $7_2$ increases in an equal manner as a function of the magnitude of the current provided by the current source 14. For the coil half $7_2$ the angle $\theta_c$ denotes the average angle $\theta$ of the coil half $7_2$, for example, for a maximum value of both the currents provided by the line and field deflection current generators 10 and 11 and of the current dependent thereon and provided by the current source 14.

Before explaining the effect of the current distribution drive in the systems 7 and 8 of deflection coils with the aid of FIG. 5, the circuit arrangements and graphs shown in FIG. 4 are described first.

Figure 4A:
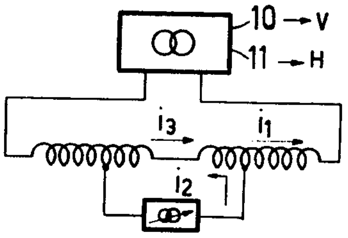
Figure 4B:
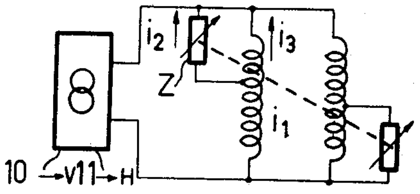

FIGS. 4*a* and 4*b* show two deflection coil halves not further indicated which are arranged in series and in parallel, respectively, and are connected to a deflection current generator which may have the reference numeral 10 or 11 (FIGS. 1 and 2). Denoted by the reference numeral 10 or 11, the deflection current generator provides the field and the line deflection currents ($i_1$) to the coil halves and currents $i_1$, $i_2$ and $i_3$ shown in FIGS. 4*a* and 4*b* may be provided with a second index V or H. In FIG. 4*a* the already described controllable current source provides the correction current $i_2$ so that a current $i_3$ flows in the plurality of turns connected in parallel therewith. In FIG. 4*b* the correction current $i_2$ flows through the controlled impedance indicated by the reference Z.

Figure 4C:
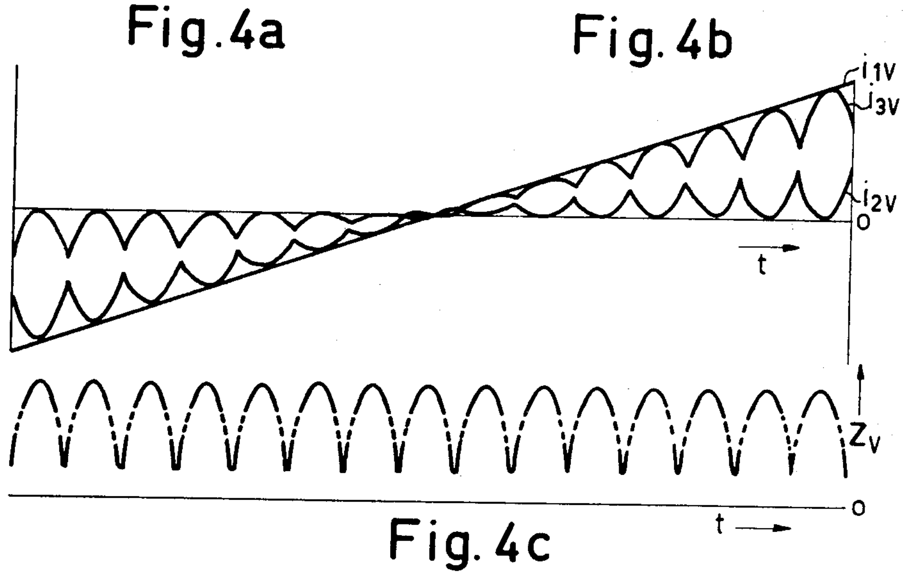
Figure 4D:
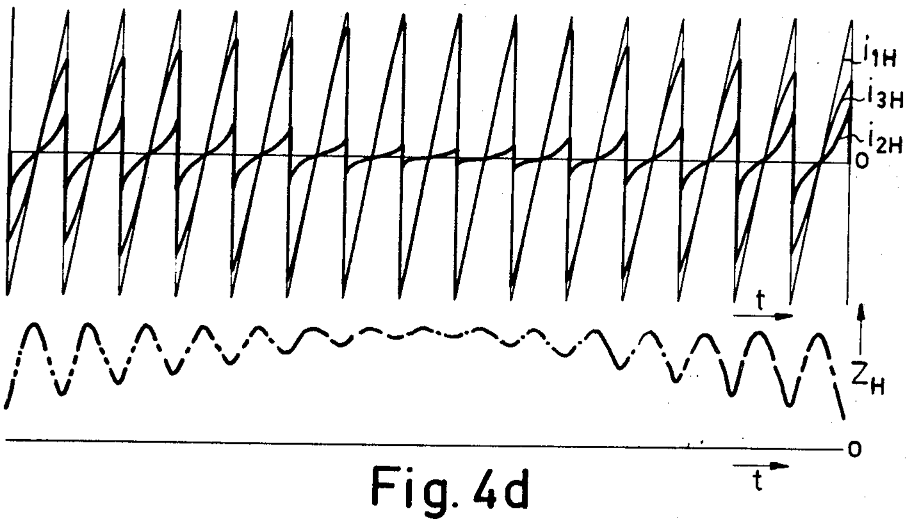

FIG. 4*c* shows as a function of time the currents and the controlled impedance of the circuits shown in FIGS. 4*a* and 4*b* for the field deflection (V). FIG. 4*d* shows the same for the line deflection (H). In FIGS. 4*c* and 4*d*, which are diagrammatically drawn, the flyback periods are not taken into account in the sawtooth field and line deflection currents $i_{1V}$ and $i_{1H}$. For the sake of simplicity a raster is considered to be consisting of fifteen lines while the use of interlacing is left out of consideration.

The correction current $i_{2V}$ shown in FIG. 4*c* has a more or less quadratic varying change during one line period, which period follows from the line deflection current $i_{1H}$ shown in FIG. 4*d*. The correction current $i_{2V}$ increases more or less parabolically towards the beginning and the end of the line period from the zero value in approximately the middle of one line period. The amplitude of the parabola in the current $i_{2V}$ and the direction thereof are determined by the instantaneous value and the direction of the field deflection current $i_{1V}$. The result is that the field deflection current $i_{1V}$ minus the current $i_{2V}$ more or less varying parabolically at the line frequency flows with amplitudes varying as a function of the field deflection current $i_{1V}$ through a number of turns of the field deflection coil halves, that is to say, current $i_{3V}$ flows.

In FIG. 4*c* the reference $Z_v$ indicates the value of the controlled impedance Z of FIG. 4*d* having a more or less inductive character, which figure also shows the described currents $i_{1V}$, $i_{2V}$ and $i_{3V}$. From a high value of $Z_V$ for a line deflection current $i_{1H}$ which is equal to zero, this impedance should be decreased in approximately quadratic manner down to a small value in case of increasing absolute values of $i_{1H}$. The linear variation of the field deflection current $i_{1V}$ then causes the variation in the current $i_{2V}$ occurring in one field period.

In FIG. 4*d* the line deflection current $i_{1H}$ increases more or less linearly in both directions from the zero value in the middle of one line period. The correction current $i_{2H}$ should, however, increase approximately quadratically in both directions, while the amplitude for each line period depends on the instantaneous value of the field deflection current $i_{1V}$. The result is that a current $i_{3H} = i_{1H} - i_{2H}$ flows in a plurality of turns of the line deflection coil halves. For the value of $Z_H$ it follows that for obtaining a more or less quadratically increasing current $i_{2H}$ for a current $i_{1H}$ linearly increasing from zero, the value of $Z_H$ must decrease more or less linearly from a high value. The extent of decrease is to be determined by the instantaneous value of the field deflection current $i_{1V}$ in order that the desired amplitude variation of the line frequency current $i_{2H}$ is obtained.

It is evident from FIGS. 2, 3 and 4 that the deflection current $i_{1V}$ or $i_{1H}$ provided by the deflection current generator 10 or 11 flows in a plurality of turns of a deflection coil system 7 or 8. However, the corrected deflection current $i_{3V}$ or $i_{3H}$ flows in the remaining number of turns which turns are provided near the window of the saddle coil in case of a saddle coil construction of the coil halves. Since the turns near the window of a saddle coil only provide a small contribution to the total deflection field generated by a coil system 7 or 8, there applies that the current distribution drive exerts little influence on the strength of the deflection field, but exerts great influence on the magnitude of the average angle $\theta$. In this case there applies that the small attenuation of the deflection field caused in practice by the current distribution drive in case of deflection towards the corners of the display screen 5 also reduces the pin-cushion distortion occurring in that area. The taps $12_1$, $12_2$, $13_1$ and $13_2$ may then be provided approximately in the middle of the coil halves $7_1$, $7_2$, $8_1$ and $8_2$.

FIG. 4*b* shows that for parallel-arranged coil halves of a system the controlled impedances or current sources are connected between a tap and each to a different end of a coil half. The cause thereof resides in the fact that it is desired to perform the current distribution control on the side of the window of the coil halves formed as saddle coils and wound in the same manner. In fact, the turns located near a window of the two coil halves convey oppositely directed currents as seen from the Z-axis of the display tube 1 in order to generate dissimilar magnetic poles. The window turns are therefore connected each to a different terminal of a deflection current generator.

To explain the influence of the current distribution control as a function of the angle $\theta$ of the coil halves $7_1$, $7_2$, $8_1$ and $8_2$ in FIG. 2, FIG. 5 shows by way of a graph a few error coefficients. To explain the coefficients and the mutual relationship, a short simple survey of the influence of a magnetic deflection field on an electron beam in a display tube 1 of FIG. 1 is given.

The starting point is that in a display tube 1 an electron gun 2 generates an electron beam at the area of $Z = O$, $X = x_o$ and $Y = y_o$ which electron beam impinges on the mask 3 at the area of $Z = z_s$. In the undeflected condition of the electron beam the point of impact thereof on the mask 3 may be indicated by $X = x_s$ and $Y = y_s$ while the slope of the beam is indicated by $x'_s$, $y'_s$. The references $x_s$, $y_s$, $x'_s$ and $y'_s$ are indicated as beam parameters. If the electron beam generated by gun 2 is deflected in the X and Y directions by the deflection coil systems 8 and 7 in accordance with the so-called ideal Gaussian deflection, then there applies for the point of impact on the mask 3:

$$X = x_s + X_s \text{ with } X_s = \mu_o k_o \int^{z_s} (z_s - z)\, H_o(z)\, dz$$

$$Y = y_s + Y_s \text{ with } Y_s = -\mu_o k_o \int^{z_s} (z_s - z)\, V_o(z)\, dz$$

and for the slope:

$$x'_s + X'_s \text{ with } X'_s = \mu_o k_o \int^{z_s} H_o(z)\, dz$$

$$y'_s + Y'_s \text{ with } Y'_s = -\mu_o k_o \int^{z_s} V_o(z)\, dz$$

wherein $\mu_o$ is the permeability, $k$ is a constant which is dependent on the velocity and the mass of the electrons in the beam and on an acceleration voltage in the gun 2 while $H_o(z)$ and $V_o(z)$ indicate the magnetic field strength generated along the Z-axis by the deflection coil systems 8 and 7, respectively.

It is evident from the foregoing that the deflection of an electron beam is proportional to the magnetic field strength in case of the Gaussian deflection and is the same for each beam independent of the beam parameters.

Due to two-fold field symmetries in the magnetic fields errors of an odd order can only occur. Of these errors only the third-order errors becoming manifest at the area of the mask and the screen 5 of the display tube 1 will be considered.

The third-order errors have the result that in addition to the displacement and slope of the electron beam obtained by the Gaussian deflection this electron beam acquires an additional displacement $\Delta x_3$ and $\Delta y_3$ and an additional contribution in the slope with $\Delta x'_3$, $\Delta y'_3$.

A further elaboration of the additional displacement obtained by the third-order errors results, for example, for $\Delta x_3$ in:

$$\Delta x_3 = \Delta x_{30} + \Delta x_{31} + x_{32}, \text{ wherein}$$

$\Delta x_{30}$ is the pincushion or barrel distortion $\Delta x_{31}$ is caused by picture field curvature and astigmatism, and $\Delta x_{32}$ represents the error caused by coma.

The pincushion or barrel distortion may be compensated in known manner by modulation of the line and field deflection currents, while the systems of coils can be rendered substantially free from coma by their design.

A further elaboration of the displacement caused by picture field curvature and astigmatism results for $\Delta x_{31}$ in:

$$\Delta x_{31} = \Delta x_{311} + \Delta x_{312} + \Delta x_{313} + \Delta x_{314},$$

wherein $\Delta x_{311} + \Delta x_{313}$ represents the displacement caused by picture field curvature, isotropic astigmatism and similar errors, and $\Delta x_{312} + \Delta x_{314}$ represents the displacement caused by anisotropic astigmatism and similar errors, In practice it is found that in many cases the displacements $\Delta x_{313}$ and $\Delta x_{314}$ may be substantially negligible relative to $\Delta x_{311}$ and $\Delta x_{312}$.

For the remaining displacements $\Delta x_{311}$ and $\Delta x_{312}$ and the corresponding displacements $\Delta y_{311}$ and $\Delta y_{312}$ it can be derived mathematically that:

$$\Delta x_{311} = (A_{304} X_s^2 + B_{305} Y_s^2)\, x'_s$$

$$\Delta y_{311} = (B_{304} Y_s^2 + A_{305} X_s^2)\, y'_s \qquad (1)$$

and $$\Delta x_{312} = (A_{306} + B_{306})\, X_s Y_s y'_s$$

$$\Delta y_{312} = (A_{306} + B_{306})\, X_s Y_s x'_s \qquad (2)$$

wherein the references $A_n$ and $B_n$ ($n = 304$, 395 or 306) represent error coefficients which are associated with a design of a system of deflection coils for the line and the field deflection. The error coefficients $A_n$ and $B_n$ then apply at the area of the mask 3 in the display tube 1.

It has been found by way of measurements and calculations that the coefficients $A_n$ and $B_n$ may be plotted as a function of the already indicated angle $\theta$ of a system of deflection coils, which has been done in FIG. 5.

The deflection of an electron beam generated by the electron gun 2 of FIG. 1 only by means of the line or field deflection coil systems 8 or 7 results in a displacement of the point of impact on the mask 3 along the X or Y axis shown in FIG. 2. For the deflection along the X-axis and the Y-axis, $Y_s = 0$ and $X_s = 0$, respectively, so that in both cases no error caused by the anisotropic astigmatism occurs since it follows from formula (2) that $\Delta x_{312} = \Delta y_{312} = 0$. The isotropic astigmatism and the picture field curvature cause, however, a displacement error and it follows from formula (1) that there applies exclusively for deflection along the X-axis that:

$$\Delta x_{311} = A_{304} X_s^2 x'_s$$

$$\Delta y_{311} = A_{305} X_s^2 y'_s \qquad (3)$$

and exclusively for deflection along the Y-axis:

$$\Delta x_{311} = B_{305} Y_s^2 x'_s$$

$$\Delta y_{311} = B_{304} Y_s^2 y'_s \qquad (4)$$

Dependent on the type of display tube 1 of FIG. 1, certain requirements to be imposed on the system 8 of line deflection coils and the system 7 of field deflection coils by which requirements the coefficients $A_n$ and $B_n$ of FIG. 5 are determined follow from the foregoing.

Let it be assumed that we have a display tube 1 formed as a shadow-mask tube or chromatron tube having one or three electron guns 2 through which three electron means are generated in an equilateral triangular configuration, which beams are deflected over a very large angle of, for example, 55° on either side of the Z-axis. It is desired to perform a dynamic convergence which is as simple as possible so as to obtain the required satisfactory superposition of the three points of impact of the electron beams on the color selection raster in the display tube 1 formed as a shadow mask 3 or as a wire raster. In this case there also applies the requirement regarding a satisfactory color purity throughout the screen 5.

It is easiest to perform the same dynamic convergence on the three electron beams, which may be effected with the aid of, for example, a radial convergence on an electrostatic basis. The requirement follows that the displacement in the radial direction of the three points of impact of the electron beam caused by the third-order errors of the deflection coil systems 7 and 8 must be more or less equal. Elaboration of the formulas (3) and (4) for each of the three beams in case of deflection along the X-axis or the Y-axis while taking into account the condition of equal radial displacements of the points of impact leads to the requirement that $A_{304} = A_{305}$ applies for the line deflection coil system 8 and $B_{304} = B_{305}$ applies for the field deflection coil system 7. It follows that the dynamic convergence is proportional to $X_s^2$ or $Y_s^2$ for the deflection along the X-axis or the Y-axis.

Comparison of the formulas (3), (4) and (1) shows that for the requirement $A_{304} = A_{305}$ and $B_{304} = B_{305}$ for equal radial displacements of the points of impact along the X-axis or the Y-axis the displacement given in formula (1) corresponds to the sum of that given in the formulas (3) and (4). The conclusion is that in the case of deflection of the three beams in both direction, due to superposition of the convergences performed along the X-axis and the Y-axis, the condition for equal radial displacements of the points of impact can be satisfied automatically. The result is that due to the use of the equal radial convergence the equal radial deflection errors caused by the isotropic astigmatism and the picture field curvature do not cause superposition errors on the display screen 5. Deflection coil systems employing the above-mentioned formulated requirements are referred to as anastigmatic deflection coil systems.

FIG. 5 shows that a deflection coil system employing the condition $A_{304} = A_{305}$ or $B_{304} = B_{305}$ has a certain value of the coefficient $A_{306}$ or $B_{306}$. Since the coefficients $A_{306}$ and $B_{306}$ of approximately the value minus four are not negligibly small, the result is that the displacement of the points of impact of the electron beams given in formula (2) is not negligible in case of a great deflection in both the X- and the Y-directions. In that case the displacements of the points of impact caused by the anisotropic astigmatism are found to be proportional to the product of the deflection in the X direction as well as the Y direction, while no identical radial displacements occur for the three points of impact. Inadmissible superposition errors appear in the corners of the display screen 5 in case of large deflection angles of the electron beams in the display tube 1. According to the invention the superposition errors may be prevented in that the deflection coil systems 7 and 8 for the deflection towards the corners of the display screen 5, which systems are anastigmatic in case of deflection near the X- and Y-axes, are dynamically rendered astigmatic in such a manner that $A_{306} = B_{306} = 0$. A comparison of FIGS. 2 and 5 and the angles $\theta_o$ and $\theta_c$ shown therein shows the relationship between the steps described with reference to FIGS. 1 and 2 for the current distribution drive and the background thereof.

The foregoing described a control in which both deflection coil systems 8 and 7 ($A_{304} = A_{305}$ and $B_{304} = B_{305}$ which are anastigmatic of origin, are rendered astigmatic for both of their great deflection angles such that the anisotropic astigmatism becomes nil ($A_{306} = 0$ and $B_{306} = 0$). It is found from formula (2) that for $A_{306} = -B_{306}$ there also applies that $\Delta x_{312} = \Delta y_{312} = 0$ so that the deflection error caused by the anisotropic astigmatism of one deflection coil system prevents or eliminates the error of the other system. With the aid of FIG. 5 it follows that, for example, in an anastigmatic noncontrolled line deflection coil system 7 ($A_{304} = A_{305}$) no displacement of the point of impact occurs due to the anisotropic astigmatism in that the field deflection coil system 8 ($B_{304} = B_{305}$), which is likewise anastigmatic of origin, is rendered astigmatic for both of its great deflection angles in such a manner that the coefficient $B_{306}$ reverses its sign and becomes equal to $-A_{306}$. In practice, the astigmatism then introduced does not result in disturbing deflection errors in the corners of the display screen 5, since also errors of a higher order play a role which exert a compensating influence in case of a satisfactory proportioning of the deflection coil systems 7 and 8.

Requirements which are different from those described hereinbefore are imposed on the deflection coil systems 7 and 8 which are suitable for use in a display tube of FIG. 1 formed as an indexing tube or as a shadow-mask tube or chromatron tube driven by three electron beams which are arrayed in one plane. The indexing tube may be formed with a luminescent layer 4 comprising strips located parallel to the Y-axis, the gun 2 generating a single electron beam the cross-section of which is elliptic. The said electron beam plane in the shadow-mask or chromatron tube includes, for example, the X-axis and is at right angles to the display screen 5. In both cases color or superposition errors are found to occur on the screen 5 when one point of impact or the three points of impact of the electron beams undergo a displacement in the X-direction caused by third-order deflection errors. It follows with the aid of the formulas (1), (3) and (4) that the requirement of $A_{304} = B_{305} = 0$ must be imposed on the deflection coil systems 8 and 7. As a result the two deflection coil systems 8 and 7 are greatly astigmatic, that is to say, a deflected electron beam does not have one focal point but a sagittal and a meridional focal line which are located in the direction of deflection and at right angles thereto, respectively. Of a system 8 of line deflection coils having to the coefficient $A_{304} = 0$, the meridional focal line of a deflected electron beam, that is to say, the meridional plane of the picture, approximately coincides with the screen 5 or the mask 3. The coefficient $B_{305} = 0$ is associated with a system 7 of field deflection coils the sagittal picture plane of which coincides with the screen 5 or the mask 3. Particularly for the indexing tube the result without the influence of deflection errors would be that the point of impact of the electron beam on the entire screen 5 has the shape of an ellipse situated in the Y-direction.

It follows from FIG. 5 that a comparatively small positive $A_{306}$ is associated with $A_{304} = 0$, while for $B_{305} = 0$ a comparatively great negative $B_{306}$ occurs. To avoid the displacements in the corners of the screen 5 caused by the anisotropic astigmatism given in formula (2), the coefficient $B_{306}$ may be reduced dynamically by means of the current distribution drive until the relation $B_{306} = -A_{306}$ has been satisfied In that case only the angle $\theta$ of the field deflection coil system 7 is enlarged. In case of a control wherein the coefficients $A_{306}$ and $B_{306}$ are both rendered equal to zero, it is required that unlike the controls described so far, the angle $\theta$ of the system 8 of line deflection coils is reduced.

FIGS. 4*c* and 4*d* show that the correction currents $i_{2V}$ and $i_{2H}$ vary more or less parabolically over one line period, while the amplitudes occurring at the line frequency undergo a more or less linear variation during one field period. The more or less linear amplitude variation occurring in a field period follows in a simple manner from formula (2). The cause of the more or less parabolic line frequency variation of the correction currents $i_{2V}$ and $i_{2H}$, which variation is required in practice for great deflection angles, can be found in deflection errors of a higher order which are not further mentioned in this description. Reference is also made to the fact that near the X and Y-axes substantially no correction for the anisotropic astigmatism is required, since in this region the effect of this error is still negligibly small. In case of deflection towards the edges of the screen 5 situated parallel to the Y-axis, particularly in the corners, a correction current is required which increases more than linearly.

In the foregoing it has been described that for a display tube 1 of FIG. 1 formed as a shadowmask tube or chromatron tube and being provided with, for example, one electron gun 2 which generates three electron beams in an equilateral triangular configuration it is desirable to use an equal radial convergence on the three beams. In that case it has been stated that the relation $A_{304} = A_{305}$ and $B_{304} = B_{305}$ applies for the deflection coil systems 7 and 8. Due to the current distribution drive performed in the deflection coil systems 7 and 8 upon deflection in the X-direction as well as the Y-direction, the displacement given in the formula (1) caused by the isotropic astigmatism and the picture field curvature is found to vary. It follows from FIG. 5 that decreasing coefficients $A_{304}$ and $B_{304}$ and increasing coefficients $A_{305}$ and $B_{305}$ occur in case of the coefficients $A_{306}$ and $B_{306}$ going towards zero due to the current distribution drive. The decrease and increase are then substantially equal. The current distribution drive thereby changes the influence of the two terms in the displacements given in formula (1), but not their character. The three points of impact of the electron beams thus maintain the desired equal radial displacement the magnitude of which, however, has been varied by the current distribution drive. For performing a radial convergence adapted to the current distribution drive the convergence circuit 16 is provided in the display device according to FIG. 1.

In the display device according to FIG. 1 the electron gun 2 partially shown in a cross-section is connected to the convergence circuit 16 which can provide both the convergence voltage which is normally to be provided and the additional convergence voltage required for the current distribution drive. A cathode 21 of the gun 2 is shown which forms part of a system of three separate cathodes which are arranged in the vertices of an equilateral triangle. The gun 2 has a common grid which is formed as a so-called Wehnelt cylinder 22. The Wehnelt cylinder 22 is provided with three holes for the cathodes one of which holes, which is associated with the cathode 21, is shown. As reckoned from the cathode 21 a common acceleration electrode 23 likewise provided with three holes and a focusing electrode 24 follow the Wehnelt cylinder 22 which electrodes are followed by a convergence electrode 25 formed from two interconnected circular cylindrical bushes and an acceleration electrode 26 from one bush. A broken line denotes the path of an electron beam provided by the cathode 21 under the influence of a video-signal applied thereto. The beam is focused by the electric field between the focusing electrode 24 and the electrodes 23 and 25 located on either side. The electrodes 25 and 26 constitute a convergence lens the action of which is dynamically controlled as a function of the magnitude of the deflection of the electron beams generated by the gun 2. To this end the convergence circuit 16 is connected to the electrode 25 of the convergence unit (25, 26).

The foregoing and particularly FIG. 2 describes a saddle-coil construction of the coil halves of the deflection coil systems 7 and 8. It is alternatively possible to form the coil halves $7_1$, $7_2$ and $8_1$, $8_2$ as toroid coils. FIG. 6 shows coil halves $7'_1$ and $7'_2$ formed as toroid coils shown in FIG. 6b while FIG. 6a once more shows for the purpose of comparison (FIG. 2) the saddle-coil construction of the coil halves $7_1$ and $7_2$. To simplify FIG. 6, only one of the two deflection coil systems is shown which are provided on the yoke 9. Unlike the current source of FIG. 2, the current source 14 in FIG. 6a is split up into two current sources $14_1$ and $14_2$.

The coil halves $7'_1$ and $7'_2$ formed as toroid coils shown in FIG. 6b are wound around a yoke 9' and are each provided with two taps $12_{11}$, $12_{12}$ and $12_{21}$, $12_{22}$, respectively. Controllable current sources $14_{11}$, $14_{12}$, $14_{21}$ and $14_{22}$ are connected between the taps and the nearest located ends, respectively. Likewise as in FIG. 6a and FIG. 2, FIG. 6b shows the angle $\theta_o$. When the controllable current sources $14_{11}$ to $14_{22}$ provide a correction current which is oppositely directed to the deflection currents flowing in the coil halves $7'_1$ and $7'_2$, the angle $\theta$ is enlarged. In the reverse direction of the correction current, the angle $\theta$ is reduced. It is alternatively possible to arrange a current source between the taps $12_{11}$, $12_{12}$ and $12_{21}$, $12_{22}$, respectively, so as to enlarge or reduce the angle $\theta$.

When series-arranging the coil halves $7'_1$ and $7'_2$, in which case, for example, the ends located near the taps $12_{22}$ and $12_{11}$ are connected together, the current sources $14_{22}$ and $14_{11}$ may be combined to form one current source. The parallel arrangement of the coil halves $7'_1$ and $7'_2$ provides the possibility of combining the current sources $14_{11}$, $14_{21}$ and $14_{12}$, $14_{22}$ to form one current source. The possibility of connection of one current source between the taps as is shown by means of broken lines and current source $14'_1$ in FIG. 6b and the parallel arrangement of the coil halves $7'_1$ and $7'_2$ creates the possibility of interconnecting the taps $12_{11}$, $12_{21}$ and $12_{12}$, $12_{22}$, respectively, and of arranging only one current source therebetween. The said controllable current sources may alternatively be replaced by controllable impedances.

FIGS. 6a and 6b show the angle $\theta_o$ for both halves of the system of deflection coils. For a satisfactory symmetrical deflection of an electron beam it is required that both halves have the same angle $\theta_o$. The result is that in case of bulk manufacture of the coil halves and the resultant spreading in the average angle $\theta$ the coil halves are to be selected so that they can pairwise constitute a system. When using the coil halves in a display device according to the invention an expensive selection of the coil halves is not necessary, since, for example, the line and field-frequency-controlled current source associated with one coil half can provide an adjustable direct current component so that the average angle $\theta$ may be adjusted at a value which is equal to that of the other coil half.

What is claimed is:

1. A cathode ray tube deflection circuit comprising a first pair of deflection coils oppositely disposed on said tube; a second pair of deflection coils oppositely disposed on said tube and at right angles to said first pair, said pairs being adapted to be coupled to line and field deflection generators respectively, each coil of at least one of said pairs having a tap; and means for dynamically correcting for deflection errors comprising at least one electrical element having a controlled electrical value coupled to said at least one of said taps of said one pair and to another part of said one pair whereby said element is in parallel with a portion of said one pair, said element being coupled to at least one of said generators for control of said value.

2. A circuit as claimed in claim 1 wherein said element comprises a controlled current source coupled to both of said generators, said source providing a current varying substantially parabolically in one line period and having an amplitude that varies with the field period.

3. A circuit as claimed in claim 1 wherein said element comprises a controlled impedance coupled to said field deflection coils, said element having an impedance that varies substantially parabolically during one line period.

4. A circuit as claimed in claim 1 wherein said element comprises a controlled impedance coupled to said line deflection coils, said element having an impedance varying with the field period, said impedance being a maximum value when the line deflection current is zero.

5. A circuit as claimed in claim 1 wherein said tapped coil comprises a saddle coil having a window, said tap being located proximate said window.

6. A circuit as claimed in claim 5 wherein said tapped coils are coupled in series with each other and said one generator, said element being coupled between said taps.

7. A circuit as claimed in claim 5 wherein said tapped coils comprise saddle coils wound in the same sense and are coupled in parallel with each other and said one generator, said element comprising two sub-elements coupled to said taps and the ends of said tap coil pair respectively.

8. A circuit as claimed in claim 1 wherein said one coil pair comprises a pair of toroid coils, each of said halves having two taps.

9. A circuit as claimed in claim 8 wherein said element is coupled to one of said taps and one of the ends of said coils.

10. A circuit as claimed in claim 9 wherein said one coil pair is coupled in series with each other and said one generator.

11. A circuit as claimed in claim 9 wherein the coil halves are parallel coupled to said one generator, the connected ends and adjacent taps being coupled to said element.

12. A circuit as claimed in claim 8 wherein said element is parallel coupled to two taps of one of said coil halves.

13. A circuit as claimed in claim 12 wherein both of said coil halves are parallel coupled to said one generator, corresponding coil taps being coupled together.

14. A circuit as claimed in claim 1 wherein said coils comprise anastigmatically formed coils and said element comprises means for reducing the current in the coil portion coupled in parallel therewith.

15. A circuit as claimed in claim 1 wherein a meridional picture plane of said coils substantially coincides with the display screen of said tube and said element comprises means for increasing the current in the portion of the coil coupled in parallel therewith.

16. A circuit as claimed in claim 1 wherein said other coil pair comprises taps, and further comprising a second controlled value element coupled thereto.

17. A circuit as claimed in claim 1 wherein said coils comprise anastigmatically formed coils and further comprising a convergence circuit coupled to said generators and adapted to be coupled to an electrostatic convergence means of a three gun display tube.

18. A circuit as claimed in claim 1 wherein each half of said coil pairs comprises a least one tap.

* * * * *